(12) United States Patent
Haest

(10) Patent No.: US 9,028,117 B2
(45) Date of Patent: May 12, 2015

(54) HEADLIGHT FOR A TWO-WHEELED VEHICLE

(75) Inventor: Benedictus Haest, Haasrode (BE)

(73) Assignee: Quality Electronics Design S.A., Luxembourg (LU)

(*) Notice: Subject to any disclaimer, the term of this patent is extended or adjusted under 35 U.S.C. 154(b) by 143 days.

(21) Appl. No.: 13/817,710

(22) PCT Filed: Aug. 10, 2011

(86) PCT No.: PCT/EP2011/063739
§ 371 (c)(1),
(2), (4) Date: Feb. 19, 2013

(87) PCT Pub. No.: WO2012/022658
PCT Pub. Date: Feb. 23, 2012

(65) Prior Publication Data
US 2013/0148369 A1    Jun. 13, 2013

(30) Foreign Application Priority Data
Aug. 18, 2010  (FR) ...................................... 10 56641

(51) Int. Cl.
*B62J 6/02*    (2006.01)
*B60Q 1/076*    (2006.01)
*B60Q 1/115*    (2006.01)
*B60Q 1/12*    (2006.01)

(52) U.S. Cl.
CPC . *B62J 6/02* (2013.01); *B60Q 1/076* (2013.01); *B60Q 1/115* (2013.01); *B60Q 1/122* (2013.01); *B60Q 2300/112* (2013.01); *B60Q 2300/132* (2013.01); *B60Q 2300/134* (2013.01); *B60Q 2300/136* (2013.01); *B60Q 2300/322* (2013.01); *B62K 2207/02* (2013.01)

(58) Field of Classification Search
USPC .................................. 362/473, 545, 460–469
See application file for complete search history.

(56) References Cited

U.S. PATENT DOCUMENTS 4,246,628 A * 1/1981 Ikemizu et al. ................ 362/527

FOREIGN PATENT DOCUMENTS

| FR | 2844759 A1 | 3/2004 |
| JP | 3-125640 A | 5/1991 |
| NL | 1034984 C2 | 8/2009 |

OTHER PUBLICATIONS

Joshua P. Coaplen et al. "On Navigation Systems for Motorcycles: The Influence and Estimation of Roll Angle", The Journal of Navigation, 2005, pp. 375-388, vol. 58, Departement of Mechanical Engineering, University of California, USA.

(Continued)

*Primary Examiner* — Elmito Breval
(74) *Attorney, Agent, or Firm* — Cantor Colburn LLP

(57) ABSTRACT

The invention relates to a headlight (100) for a two-wheeled vehicle (1), including at least one light source combined with at least one reflector for reflecting the light from the light source in the traveling direction of the vehicle (e1), characterized in that the headlight has a rotational axis about which it can pivot, said axis extending, when the headlight is in a reference position corresponding to a position in which the vehicle is substantially vertical and not inclined, in a substantially median and vertical longitudinal plane (e1, e3) of the headlight, the rotational axis further being inclined relative to the vertical direction.

9 Claims, 3 Drawing Sheets

(56) References Cited

OTHER PUBLICATIONS

Anthony Fry et al. "Corner Adapting Motorcycle Headlight", Technical Design Report, May 29, 2002, 63 pages, Department of Mechanical, Industrial and Manufacturing Engineering, College of Engineering, Northeastern University, Boston MA 02115.

"A Study on Motorcycle AFS Visibility and Glare", 59th GRE, Informal Document, Mar. 31-Apr. 4, 2008, 5 pages, Agenda item 11(c), Japan.

International Search Report issued Oct. 31, 2011 re: PCT/EP2011/063739; pp. 4; citing: JP 3-125640 A, FR 2 844 759 A1 and NL 1 034 984 C2.

* cited by examiner

HEADLIGHT FOR A TWO-WHEELED VEHICLE

TECHNICAL FIELD

The present invention relates to a headlight for a two-wheeled vehicle, in particular a motorcycle, as well as a two-wheeled vehicle equipped with such a headlight.

BRIEF DESCRIPTION OF RELATED ART

Motorcycle headlights are designed to meet safety standards when the motorcycle is moving in a straight line and is kept substantially on the vertical of the road.

When the motorcycle undertakes a turn, the driver turns the handlebars and tilts the motorcycle. As a result, the headlight is no longer oriented in an optimal direction. The illumination of the road in the direction in which the motorcycle is oriented is thereby greatly reduced, which presents an obvious danger, in particular at night, when the driver's field of vision is extremely reduced as a result, and does not facilitate anticipation of the path (end of the turn, oncoming vehicles, obstacles, holes, etc.).

This problem is well known, and builders have sought to develop numerous solutions making it possible to optimize the orientation of the headlight as a function of the direction assumed by the motorcycle.

Known in particular are front illumination systems with three lights comprising a central headlight, designed to illuminate the road when the motorcycle is traveling in a straight line, and two side headlights, situated on either side of the central light, and designed to illuminate the road when the motorcycle is inclined, the headlight on the side where the motorcycle is inclined being lit to complete the illumination area of the central headlight.

Of course, such a system does not precisely account for the incline angle of the motorcycle and is based on an average incline angle up the heart of a standard turn.

Builders as well as institutions/universities have therefore conducted many studies to develop dynamically multi-directional headlights using actuators as a function of the incline angle of the motorcycle and potentially other parameters. It should be noted that at this time, there is no commercial solution, and the current solutions are rather based on sets of mirrors or multi-directional masks.

Aside from the relative bulk of the means for actuating and controlling headlights, a major problem in this type of system is the real-time measurement of those parameters, and in particular measurement of the incline angle of the motorcycle.

Traditionally, a gyroscopic sensor is used to measure the incline of the motorcycle and deduce therefrom the correction to be applied to the orientation of the headlight.

Recent technological developments have made it possible to introduce MEMS accelerometer and gyroscopic sensors, which are less expensive and more reliable. The mechanical part of orienting the headlight remains relatively complex, however, which is a potential source of numerous breakdowns and failures of the system, limiting the practical implementation of such products.

For more information on measuring the incline angle, reference may be made, inter alia, to the following articles:

On Navigation Systems for Motorcycles: The influence and Estimation of Roll Angle (2005)—USA, Department of Mechanical Engineering, University of California. THE JOURNAL OF NAVIGATION (2005), 58, 375-388.

A Study on Motorcycle AFS Visibility and Glare (59$^{th}$ GRE, Mar. 31-Apr. 4, 2008)—Japan.

Corner Adapting Motorcycle MIM 1501-1502. Technical Design Report (May 29, 2002) Department of Mechanical, Industrial and Manufacturing Engineering, College of Engineering, Northeastern University, Boston, Mass. 02115.

It has also been observed that the correction angle of the headlight must at most be equal to the incline angle of the two-wheeled vehicle, and preferably slightly smaller.

Thus, to make the headlight horizontal again in a turn, it is necessary to apply a rotation thereto around an illumination and travel direction of the vehicle by an angle substantially equal to the incline angle of the motorcycle, and in any case to remain smaller than that angle.

This is the recommendation of the aforementioned Japanese study for speed conditions comprised between 30 and 60 km/h and turn radii of 30 to 140 m.

The study does not, however, mention a correction in the direction of the beams of light in the horizontal plane, in particular by orienting the headlights slightly toward the inside of the turn so as to better illuminate the portion of the road toward which the motorcyclist is traveling, and suggests that acting on the incline alone is sufficient.

It is, however, possible, in many cases, and even at reduced speeds, for the incline angle to be much larger, in particular greater than 40°, and for a significant direction correction in the horizontal plane to be necessary.

This direction correction must therefore be able to be done at the same time as the incline correction of the headlight. It will be noted that a pitch correction may also be necessary.

This generally results in the design of particularly complex, relatively bulky lighting correction means, which are therefore relatively expensive. It follows that such systems are difficult to incorporate into more modest two-wheeled vehicles such as scooters, mopeds, entry-level motorcycles, etc.

It will also be noted that the current actuating systems generally depend on the type of headlight used (elliptical, parabolic, etc.), and that there is a need for a system that is easily adaptable to all types of headlight.

BRIEF SUMMARY

The present invention aims to propose a multi-directional headlight benefiting from a simpler and more reliable mechanical system.

To that end, the present invention relates to a headlight for a two-wheeled vehicle, including at least one light source combined with at least one reflector for reflecting the light from the light source in the traveling direction of the vehicle, the headlight having a rotational axis around which it can pivot, said axis extending, when the headlight is in a reference position corresponding to a position in which the vehicle is substantially vertical and not inclined, in a substantially median and vertical longitudinal plane of the headlight, the rotational axis further being inclined relative to the vertical direction, characterized in that it comprises at least one actuator capable of rotating the headlight around its axis.

In this way, by providing a headlight having an axis of rotation situated in a substantially median longitudinal plane of the headlight and inclined relative to the vertical direction, a rotation of the headlight around that axis will cause a simultaneous correction of the incline angle of the vehicle and the projection direction of the light. The combination with driving means also allows precise driving of the headlight, in particular using a controller combined with sensors.

Preferably, the incline angle of the axis of rotation is comprised between 20 and 45°.

Also preferably, the incline angle of the axis of rotation is substantially equal to 45°.

In fact, with a primary axis of rotation substantially inclined at 45°, the corrections made to the incline and the projection direction of the light are substantially identical. A variation in the angle of the primary axis of rotation will make it possible to define an appropriate and optimal simultaneous correction relationship for these two angles according to the concerned vehicle.

It will also be noted that the correction can be done with a single actuator and with a relatively modest amplitude. The construction and control of the headlight are therefore greatly simplified, and the final cost is reduced.

Additionally advantageously, the headlight has a second axis of rotation around which it can pivot, said second axis of rotation being oriented, when the headlight is in its reference position, in a substantially median plane of the substantially horizontal headlight and in a direction substantially transverse to the projection direction of the light. The possibility of rotation around this second axis allows a possible correction of the pitch if necessary.

Also additionally advantageously, the headlight has a third axis of rotation around which it can pivot, said third axis of rotation being oriented, when the headlight is in its reference position, in a substantially vertical direction of the headlight.

Preferably, the headlight comprises at least one means for rotating the headlight around the second and/or third axis of rotation.

Advantageously, the means for rotating around the axes are rotary and/or linear actuators with a low amplitude, preferably rotary. The rotary actuators are less expensive and more reliable.

Additionally, the headlight comprises at least one diaphragm. More specifically, it may be a high beam or low beam or both by means of said diaphragm.

Advantageously, the headlight comprises at least one microcontroller capable of controlling the actuator(s) as a function of input parameters such as the speed of the vehicle and the incline angle of said vehicle.

Alternatively, this microcontroller and the sensors may belong to the vehicle.

According to alternative embodiments, the headlight comprises at least one gyroscopic sensor and/or at least one inclinometer.

It will also be noted that the headlight may indifferently be of the elliptical or parabolic type.

The present invention also relates to a two-wheeled vehicle, in particular a motorcycle, characterized in that it comprises at least one headlight according to the invention.

The term "two-wheeled vehicle" does not exclude vehicles of the three-wheeled scooter type, the issue of the incline on turns also applying to that type of vehicle.

BRIEF DESCRIPTION OF THE DRAWINGS

The present invention will be better understood in light of the following detailed description in reference to the appended drawing, in which.

DETAILED DESCRIPTION

Figure 1:
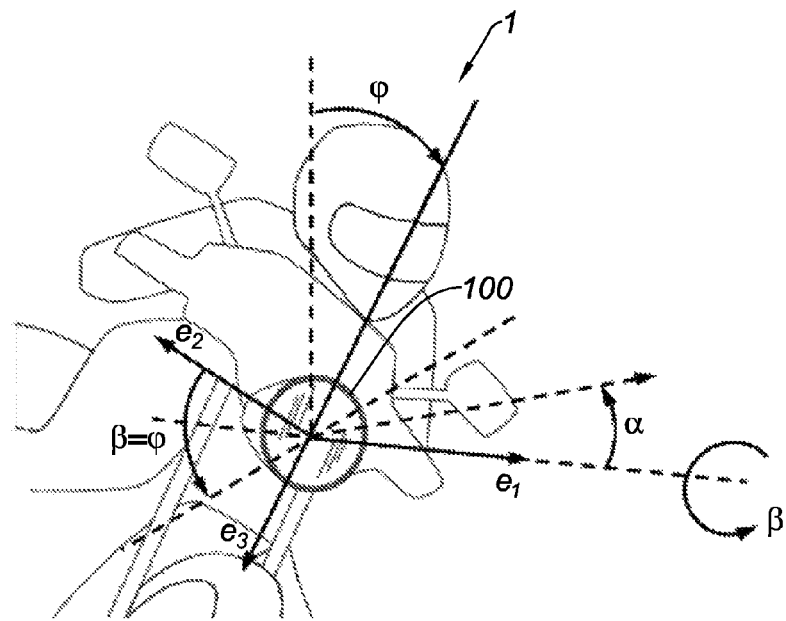
FIG. 1 is a diagrammatic illustration of a motorcycle inclined in a turn with its associated three-dimensional reference.

FIG. 1 is a partial view of a motorcycle equipped with a headlight 100 according to the invention. The motorcycle 1 is inclined in a turn, and its associated three-dimensional reference {e1, e2, e3} has been shown in dotted lines and solid lines, respectively corresponding to the reference when the motorcycle 1 is upright and when the motorcycle 1 is inclined.

The axis e1 corresponds to a direction of travel of the motorcycle, and is therefore not modified by the incline. However, it also represents the projection direction of the light from the headlight, direction which, in a turn, should be corrected by an angle $\alpha$.

The axis e2 corresponds to a direction transverse to the motorcycle 1. When the motorcycle 1 is upright, the axis e2 substantially corresponds to a horizontal direction. When the motorcycle 1 is inclined in a turn, the axis e2 undergoes a rotation by an angle $\beta$ around the axis e1.

The axis e3 corresponds to a substantially vertical direction when the motorcycle 1 is upright. When the motorcycle 1 is inclined in a turn, the axis e3 is inclined by an angle $\phi$ (roll angle).

Figure 2:
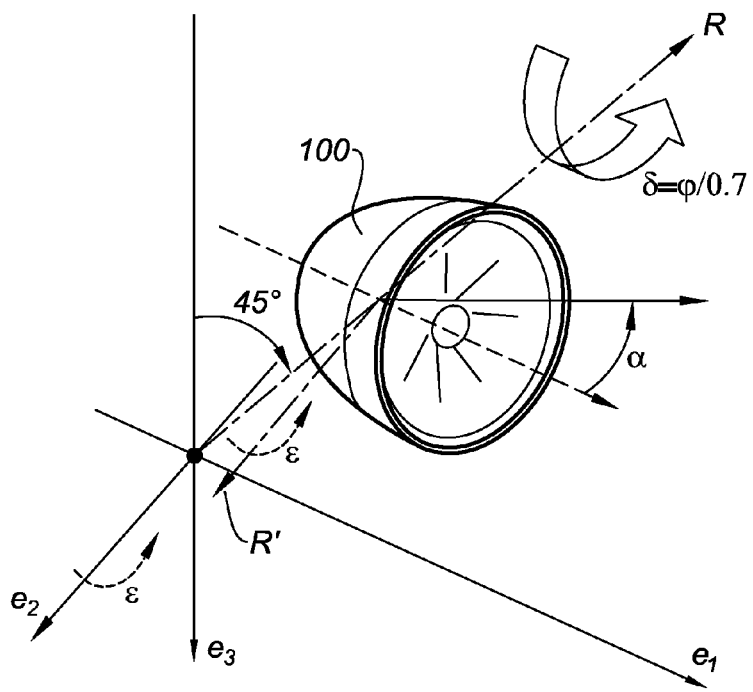
FIG. 2 is a diagrammatic illustration of a headlight and its correction axes.

FIG. 2 is a detailed view of the headlight 100 and axes previously defined on which the necessary corrections according to the invention have also been marked.

As previously explained, it is recommended for the compensation correction made to the headlight according to the angle $\beta$ to be substantially equal to the incline angle $\phi$ of the motorcycle 1, or slightly smaller. A correction according to the angle $\alpha$ is also necessary.

In order to simply and effectively make the necessary corrections according to the invention, the headlight 100 has an axis of rotation R (thick arrow) inclined relative to the vertical axis e3. In the case at hand, the axis R is inclined by 45° relative to e3.

By rotating the headlight around the axis R by an angle $\delta$, compensation will be done both on the angles $\alpha$ and $\beta$.

It will be noted that with an axis of rotation R of the headlight 100 inclined at 45°, the corrections made will be the angles $\alpha$ and $\beta$ will be identical.

A modification in the incline of the axis of rotation R of the headlight 100 will make it possible to change this correction ratio between $\beta$ and $\alpha$ as a function of the considered vehicle to obtain an optimal correction.

In the case at hand, the angle $\delta=\phi/0.7$ (in this case), with an axis of rotation R inclined by 45° ($\alpha=\beta=\phi$), and a single actuator, preferably rotary, makes it possible to perform this double correction.

As a function of the vehicle and if necessary, it may also be interesting to take the pitch of the vehicle 1 into account and correct it. In fact, when the motorcycle 1 is inclined, the height of the headlight 100 relative to the ground is reduced. As a result, the portion of the path illuminated in front of the motorcycle 1 is also reduced and that pitch should be corrected. Furthermore, the distance between the motorcycle and the location to be illuminated depends significantly on the curvature (radius) of the turn and the speed of the motorcycle.

To that end, according to one additional aspect of the invention, the headlight 100 has a second axis of rotation R', substantially parallel to e2 and passing through an intersection of the rotary axis R with a center line of the headlight substantially parallel to e1, around which it will be pivoted by a compensation angle ε.

In general, such a correction remains limited and a rotary or linear actuator with a small amplitude may be used.

As a function of the bulk and the available space, the correction actuator for the pitch may be positioned on a structure of the motorcycle 1 or in the headlight 100 itself.

Figure 3:
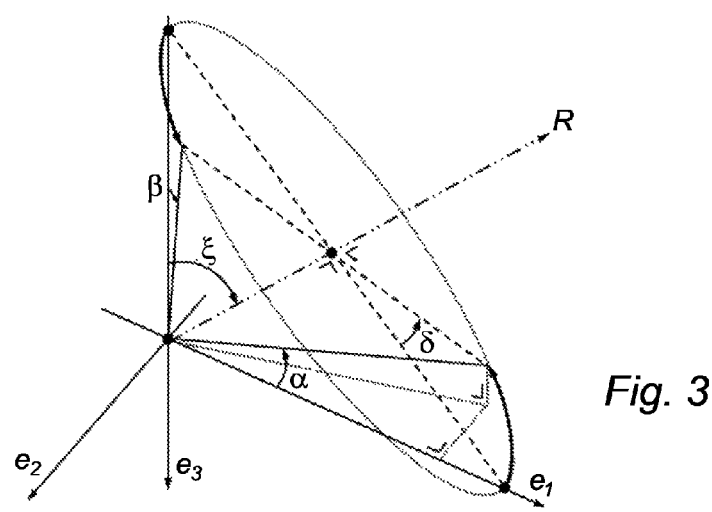
FIG. 3 is an overall view of the orientation axes of the headlight of FIG. 2, FIGS. 4 to 7 show example embodiments of headlights according to the invention.

All of the axes and corrective angles are shown in FIG. 3 without a headlight 100.

FIGS. 4 to 7 show example embodiments of headlights according to the invention.

Figure 4:
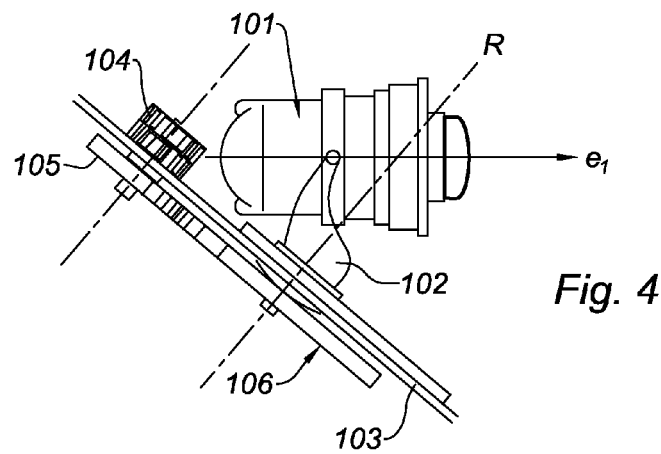

FIG. 4 shows a first example embodiment of a headlight 101 according to the invention with an axis of rotation R inclined by 40°.

The headlight 101 is held by a foot 102 rotatably mounted on a platen 103 such that the axis of rotation R is inclined by 40° relative to the vertical.

The platen 103 supports means for rotating the foot 102, and therefore the headlight 101, around the axis R.

These driving means comprise a rotary actuator 104 having axle capable of driving a toothed wheel 105 rotatably meshing with a toothed wheel 106 of the foot 102.

Of course, any alternative driving solution is possible, in particular driving using a belt, for example.

Figure 5:
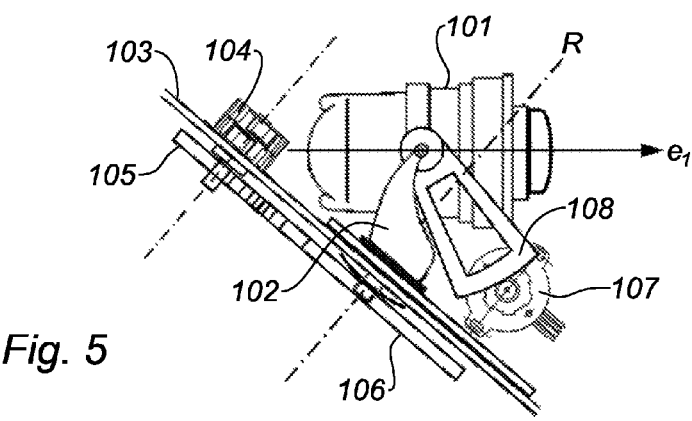

FIG. 5 shows the headlight of FIG. 4 on which a correction of the pitch is provided. To that end, the headlight 101 is associated with a second rotary actuator 107 capable of rotating a toothed arm 108 making it possible to tilt the headlight 101 around a transverse axis.

Figure 6:
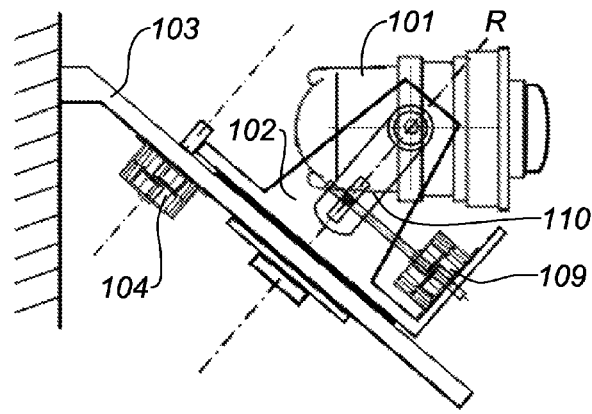

FIG. 6 shows an alternative embodiment in which a linear actuator 109 with a small amplitude pulls or pushes an associated arm 110 also so as to tilt the headlight 101 around a transverse axis.

It will be noted that one primary advantage of the correction of the pitch lies in being able to offset a change in the illumination area due to a modification in the attitude of the vehicle, in particular in case of braking or acceleration.

Figure 7:
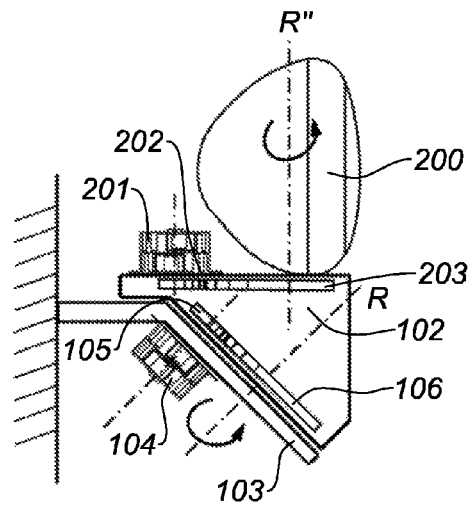

FIG. 7 shows another example embodiment of a headlight 200 according to the invention in which the headlight 200 has a third axis of rotation R" around which it can pivot, said third axis of rotation R" being oriented, when the headlight is in its reference position, in a substantially median plane of the substantially vertical headlight and in a substantially vertical direction.

The example of FIG. 7 only shows an adjustment around the first and third axes, the pitch angle not having been corrected. This nevertheless remains possible.

The headlight 200 is rotated around said axis R" by a rotary actuator 201 and driving wheels 202, 203, mounted on the foot 102 of the headlight 200.

In addition to the other axes of rotation R and R', this third axis of rotation R" allows a correction in all directions. In particular in the illustrated example, a correction of both the incline (φ) and the direction of the light beam (α) is made possible.

Figure 8:
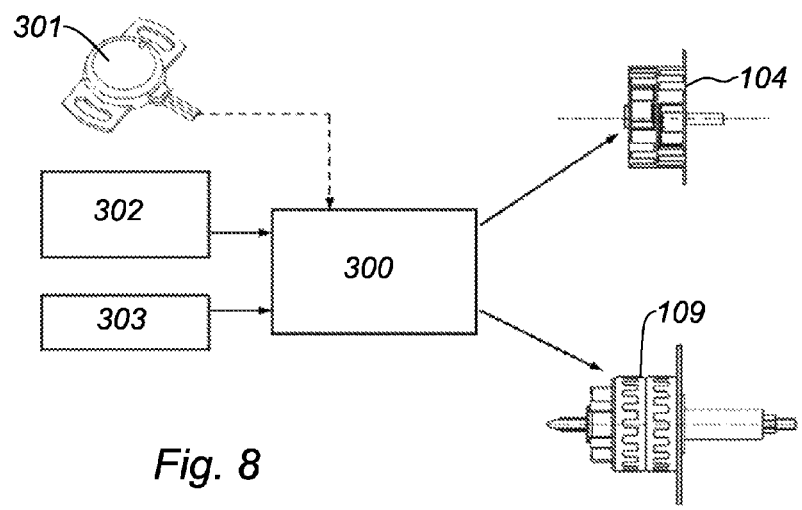
FIG. 8 is a diagrammatic illustration of a control chain of a headlight according to the invention.

FIG. 8 diagrammatically shows the arrangement of a control chain for a headlight according to the invention.

This control system is built around a microcontroller 300 capable of receiving speed and incline values from a gyroscopic MEMS sensors 302, an inclinometer 300 and a speed sensor 303.

It should be noted that the only information the microprocessor of the controller needs is the speed and the levels of the angles of rotation. The inclinometer is used when the speed of the motorcycle is zero and it does not operate when the motorcycle is traveling. However, it is used to correct the incline angle when the motorcycle tilts while stopped (red light or other reason, for example).

The yaw level, roll level, possibly pitch level, and speed are thus provided to the microcontroller 300 as parameters so that the latter can compute and send, as output, the appropriate commands to the corrective actuators 109 and 104.

Of course, this control change is provided solely as an example and must be adapted as a function of the headlight used according to the invention and the parameters necessary to determine the corrections.

In a known manner, integrating the roll level makes it possible to obtain the incline angle φ of the vehicle. This integration does, however, risk adding a growing error in the time, and the angle φ may be calibrated by the yaw rate and the speed and/or by the absolute signal from the inclinometer 301.

Using the incline angle φ, it is possible to compute the curve radius of the turn and to determine, using the speed of the vehicle, the ideal correction according to the angle α.

Although the invention has been described with one particular embodiment, it is of course in no way limited thereto and encompasses all technical equivalents of the described means as well as combinations thereof if they are within the scope of the invention.

The invention claimed is:

1. A headlight for a two-wheeled vehicle, including at least one light source combined with at least one reflector for reflecting the light from the light source in a traveling direction of the vehicle, the headlight having a rotational axis around which it can pivot, said axis extending, when the headlight is in a reference position corresponding to a position in which the vehicle is substantially vertical and not inclined, in a substantially median and vertical longitudinal plane of the headlight, the rotational axis further being inclined relative to the vertical direction, the headlight further comprising at least one actuator capable of rotating the headlight around its axis, wherein the incline angle of the axis of rotation is between 20-45°, the headlight further comprising a second axis of rotation around which it can pivot said second axis of rotation being oriented, when the headlight is in its reference position, in a substantially median plane of the substantially horizontal headlight and in a direction substantially transverse to the projection direction of the light.

2. The headlight according to claim 1, wherein the incline angle of the axis of rotation is substantially equal to 45°.

3. The headlight according to claim 1, further comprising a third axis of rotation around which it can pivot, said third axis of rotation being oriented, when the headlight is in its reference position, in a substantially vertical direction of the headlight.

4. The headlight according to claim 3, wherein it comprises at least one means for rotating the headlight around the second and/or third axis of rotation.

5. The headlight according to claim 1, wherein at least some of the actuators and/or means for rotating around the axes are rotary and/or linear actuators with a low amplitude.

6. The headlight according to claim 1, further comprising at least one microcontroller capable of controlling the actuator(s) as a function of input parameters such as the speed of the vehicle and the incline angle of said vehicle.

7. The headlight according to claim 6, further comprising at least one gyroscopic sensor.

8. The headlight according to claim 6, further comprising at least one inclinometer.

9. A two-wheeled vehicle, in particular a motorcycle, comprising at least one headlight according to claim 1.

* * * * *